United States Patent Office 3,093,651
Patented June 11, 1963

3,093,651
N-ALKYL-2-(2-[9-CARBAZOLYL-ETHYL])-
PIPERIDINES
Seymour L. Shapiro, Hastings on Hudson, Louis Freedman, Bronxville, and Harold Soloway, Tuckahoe, N.Y., assignors to U.S. Vitamin & Pharmaceutical Corporation, a corporation of Delaware
No Drawing. Filed Nov. 7, 1958, Ser. No. 772,398
5 Claims. (Cl. 260—293)

The invention relates to a process for the preparation of piperidine compounds and to the compounds thus produced. More particularly, it pertains to N- and 2-substituted piperidines and includes correlated improvements and discoveries relating to their production.

An object of the invention is to provide as novel compositions of matter derivatives of piperidine which have substituents, at least, at the 1- and 2-positions.

A further object of the invention is the provision of derivatives of piperidine which contain a carbazole residue at the 2-position.

Another object of the invention is the provision of compositions of matter which are N-alkyl-2-carbazolyl alkyl derivatives of piperidine, and non-toxic acid addition and quaternary salts of such derivatives.

A particular object of the invention is the provision of piperidines which are N-alkyl-2-(9-carbazolyl alkyl) piperidines as the free bases and their non-toxic acid addition and quaternary salts.

An additional objects of the invention is the provision of a process for the preparation of derivatives of piperidine in which a piperidine is reacted with carbazole.

Other objects of the invention will in part be obvious and will in part appear hereinafter.

The invention accordingly comprises the several steps and the relation of one or more of such steps with respect to each of the others, and the composition possessing the features, properties, and the relation of constituents which are exemplified in the following detailed disclosure, and the scope of the invention will be indicated in the claims.

In the practice of the invention piperidine compounds may be prepared by reacting a substituted piperidine with carbazole. More particularly, the substituted piperidine has the substituents at the 1- or N-position and at the 2-position. However, and in addition to such substituents, there may be substituents at one or more of the other ring-positions, viz., 3-, 4-, 5- and 6-. Further the piperidine compounds may be in the form of the free bases and as non-toxic acid addition and quaternary salts thereof.

Hence the new compounds are alkylpiperidine bases and especially alkylpiperidine derivatives containing a carbazole residue. The novel compounds are represented by the structural formula

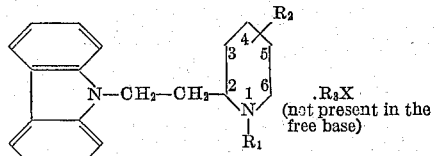

wherein $R_1$ is a lower alkyl, $R_2$ is selected from the group consisting of hydrogen and a lower alkyl, $R_3$ is selected from the group consisting of hydrogen and a lower alkyl and X is one equivalent of a non-toxic anion. The lower alkyl is one having a carbon content $C_1$-$C_3$.

The compounds of this invention are conveniently synthesized by condensing carbazole with a halide, e.g., with N-methyl-2-(2-chloroethyl) piperidine in an inert organic solvent such as benzene, toluene and xylene in the presence of a basic condensing agent, for example, sodamide, potassamide and lithium amide. After stirring and heating for a suitable period, the reaction mixture is quenched; the free base isolated, and may be converted to an acid salt or a quaternary ammonium salt.

The N-methyl-2-(2-chloroethyl) piperidine may be prepared by the following sequence of reactions. 2-(hydroxyethyl)-pyridine is reduced by hydrogenation using platinum oxide or rhodium on carbon to 2-(2-hydroxyethyl) piperidine. This compound is then hydrogenated in the presence of formaldehyde with palladium as catalyst yielding the N-methyl derivative, which is converted to N-methyl-2-(2-chloroethyl)piperidine hydrochloride by chlorination with thionylchloride. Alternatively, the quaternary salt of the 2-(2-hydroxyethyl) pyridine is prepared and reduced directly to the N-methyl-2-(2-hydroxyethyl)piperidine, which is converted to the desired chloride.

Such piperidine derivatives are represented by the formula

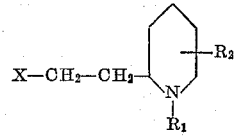

wherein $R_1$ is a lower alkyl having a carbon content of $C_1$-$C_3$, $R_2$ is hydrogen and a lower alkyl having a carbon content of $C_1$-$C_3$, and X is hydroxyl and chlorine.

The following formulas illustrate carbazole piperidine compounds.

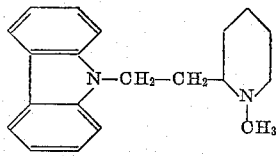

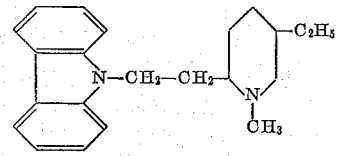

These compounds may be as the free bases, and as their stable, non-toxic acid addition and quaternary ammonium salts.

The invention will be described more fully in conjunction with the following examples. It will be understood, however, that these examples are given by way of illustration only, and that the invention is not to be construed as limited in spirit or in scope by the details set forth.

EXAMPLE 1

*Synthesis of N-Methyl-2-(2-[9-Carbazolylethyl])-5-Ethylpiperidine Represented by the Formula*

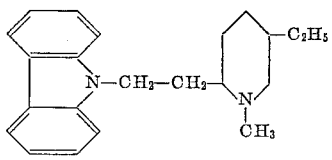

STEP A.—PREPARATION OF 5-ETHYL-2(2-HYDROXYETHYL)-PIPERIDINE

A solution of 30.2 g. (0.2 m.) of 5-ethyl-2(2-hydroxyethyl) pyridine in 220 ml. of glacial acetic acid containing 1.0 g. of platinum oxide was shaken in a hydrogenator (Parr) at room temperature and at 50–60 p.s.i.g. of hydrogen, and after 24 hours 50% of the theoretical amount of hydrogen had been taken up. An additional 0.5 g. of platinum oxide was added; shaking continued as above for 6 hours; an additional 0.5 g. charge of catalyst added, and after 23 additional hours of shaking under hydrogen pressure the theoretical amount (98%) of hydrogen had been taken up. The reaction mixture was filtered from the catalyst; the catalyst washed with water and the washings added to the filtrate. The combined filtrates were concentrated to a volume of about 50 ml. under vacuum (20 mm. Hg) and treated with excess 40% sodium hydroxide solution. The 5-ethyl-2-(2-hydroxyethyl) piperidine so produced was extracted with ether; the ethereal extract dried over anhydrous magnesium sulfate, and then filtered. The ether was removed and the product distilled, there being obtained a water-white liquid. The hydrochloride was prepared.

STEP B.—PREPARATION OF 5-ETHYL-2-(2-HYDROXYETHYL)-1-METHYL PIPERIDINE

A solution of 34.6 g. (0.22 m.) of 5-ethyl-2-(2-hydroxyethyl) piperidine in 25 ml. of acetic acid and 19.5 ml. (0.26 m.) of 37% formaldehyde was prepared and treated with palladium on charcoal (prepared by dissolving 0.25 g. of palladium chloride in 10 cc. of water containing 0.1 ml. of 3 N hydrochloric acid and 2.5 g. of charcoal (Darco)), and the whole diluted to 250 ml. The reaction mixture was hydrogenated at 30–50° C. under 50–60 p.s.i.g. of hydrogen with shaking for 25 hours when 93% of the theoretical amount of hydrogen had been taken up. The reaction mixture was filtered from the catalyst and the filtrate made basic with 40% sodium hydroxide. The oil which separated out and the aqueous alkaline phase were extracted with ether, and the ether extracts combined and dried over anhydrous magnesium sulfate. The ethereal extract was filtered; the ether removed, and the product 5-ethyl-2-(2-hydroxyethyl)-1-methyl-piperidine distilled.

STEP C.—PREPARATION OF N-METHYL-2-(2-CHLOROETHYL)-5-ETHYL PIPERIDINE HYDROCHLORIDE

A solution of 24.1 g. (0.14 m.) of 5-ethyl-2-(2-hydroxyethyl)-1-methyl-piperidine in 100 ml. of chloroform was cooled in an ice bath and a stream of dry hydrogen chloride in excess passed through. The ice bath was removed and 35.6 (0.3 m.) of thionyl chloride was added dropwise at a rate sufficient to maintain reflux. After addition of thionyl chloride had been completed, external heating was applied and the mixture refluxed 1 hour. The reaction mixture was cooled, 30 ml. of ethanol added and about 100 ml. of solvent distilled out, 100 ml. of benzene were added and the reaction mixture concentrated to a reddish syrup by removal of low boiling components. On standing the product crystallized and after trituration with ether afforded a white solid.

STEP D.—N-METHYL-2-(2-[9-CARBAZOLYL ETHYL])-5-ETHYL-PIPERIDINE

A suspension of 3.9 g. (0.1 m.) of sodamide in 125 ml. of xylene in an anhydrous system was treated with 16.7 g. (0.1 m.) of carbazole and refluxed for 1.5 hours. The reaction mixture was cooled and treated dropwise for over an hour with a xylene solution of N-methyl-2-(2-chloroethyl)-5-ethyl-piperidine (prepared from 24.9 g. (0.11 m.) of the hydrochloride as described above). After addition was complete the reaction mixture was refluxed for 2 hours and then allowed to stand overnight. The reaction mixture was filtered of the formed sodium chloride, and the filtrate extracted with 3 N hydrochloric acid. The acid layer was separated and made alkaline with 40% sodium hydroxide, and the separated oil extracted with ether. The ether extract was treated with charcoal, filtered, dried over anhydrous magnesium sulfate and treated with 50 ml. of 8% ethereal hydrogen chloride. There is thus obtained the hydrochloride of the desired piperidine which was recrystallized from methyl ethyl ketone.

The methiodide of the free base of the above compound was prepared by treating an acetonitrile solution of its free base with excess methyl iodide, allowing to stand overnight and removing the volatile products under vacuum to leave a residue of the product, which was triturated with ether and recrystallized from hexane-methyl ethyl ketone.

EXAMPLE 2

*Synthesis of N-Methyl-2-(2-[9-Carbazolylethyl]) Piperidine Represented by the Formula*

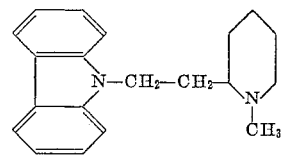

The required N-methyl-2-(2-chloroethyl) piperidine is preparable from 2-(2-pyridyl)ethanol by the sequence of reactions indicated in Steps A–C of Example 1. Alternatively, it is prepared as follows:

STEP A.—PREPARATION OF 2-(2-HYDROXYETHYL)-1-METHYL-PYRIDINIUM BROMIDE

A solution of 37 g. (0.3 m.) of 2-(2-hydroxyethyl) pyridine and 57 g. (0.6 m.) of methyl bromide in 200 ml. of acetonitrile was maintained overnight, and the volatiles removed under vacuum distillation. The product remained as an almost colorless oil.

STEP B.—PREPARATION OF 2-(2-HYDROXYETHYL)-1-METHYL PIPERIDINE

All of the product of Step A was dissolved in 250 ml. of methanol; 0.5 g. of platinum oxide added, and the reaction mixture hydrogenated at room temperature with shaking at 60 p.s.i.g. of hydrogen for 7 hours at which point 80% of the theoretical amount of hydrogen had been taken up. The reaction mixture was filtered from the catalyst; the methanol removed from the filtrate under vacuum, and the hydrobromide of the product crystallized. The hygroscopic hydrobromide was dissolved in 300 ml. of water made alkaline with 40% sodium hydroxide, and the solution saturated with potassium carbonate and extracted five times with 75 ml. of ether. The ethereal extracts were combined; dried over anhydrous magnesium sulfate; filtered; the ether removed with obtention of the piperidine compounds.

STEP C.—PREPARATION OF N-METHYL-2-(2-CHLOROETHYL)-PIPERIDINE HYDROCHLORIDE

Prepared from the compound of Step B, in the manner described in Step C, Example 1.

STEP D.—N-METHYL-2-(2-[9-CARBAZOLYLETHYL])-PIPERIDINE

To a cooled, stirred solution of 1.9 g. (0.055 m.) of sodamide in 300 ml. of anhydrous liquid ammonia was added 8.4 g. (0.05 m.) of carbazole. When the carbazole had been added, the cooling bath was removed and after 1 hour 200 ml. of dry toluene were added slowly and the ammonia allowed to distill out. After 2 hours external heat was applied and the reaction mixture refluxed for 2 hours to remove the remainder of the ammonia. The reaction mixture was cooled and a solution of N-methyl-2-(2-chloroethyl) piperidine in 60 ml. of toluene (prepared from 9.9 g. of the hydrochloride as previously described) was added dropwise over 0.5 hour. The reaction mixture was then refluxed for 8 hours, cooled and filtered from the precipitated sodium chloride. The toluene filtrate was extracted with 200 ml. of water containing 30 ml. of 3 N hydrochloric acid; the aqueous layer separated; made strongly basic with 40% sodium hydroxide, and extracted with ether. The ether extract was dried over anhydrous magnesium sulfate; filtered; the ether removed, and the residue rinsed with a small amount of pentane. The pentane insoluble free base was recrystallized from hexane.

The methiodide of this base was prepared in a manner similar to that in Example 1.

The products of the present invention, in addition to their usefulness as intermediates in the synthesis of substances having physiological activity, are new compounds exhibiting interesting pharmacological properties and can be used for therapeutic purposes. The acid addition, e.g., hydrochloride salts, and quaternary compounds of the bases described in this invention show a wide spectrum of physiological response including anti-inflammatory action, transquillizing activity, ganglionic blocking activity and anti-histaminic activity.

This application is a continuation-in-part of our copending application Serial No. 593,057, filed June 22, 1956, and now abandoned.

It will thus be seen that the objects set forth above, among those made apparent from the preceding description, are efficiently attained and, since certain changes may be made in carrying out the above process and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. As a composition of matter, a compound from the group consisting of compounds represented by the formula

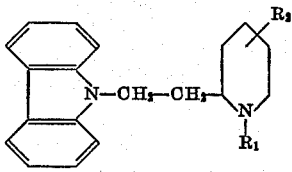

wherein $R_1$ is lower alkyl of from one to about three carbon atoms, $R_2$ is selected from the group consisting of hydrogen and lower alkyl of from one to about three carbon atoms, and the nontoxic pharmacologically acceptable acid and quaternary ammonium salts thereof represented by the formula

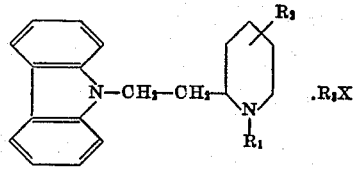

wherein $R_3$ is selected from the group consisting of hydrogen and lower alkyl of from one to about three carbon atoms and X is a pharmacologically acceptable nontoxic anion.

2. As a composition of matter a piperidine compound represented by the formula

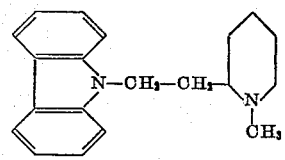

3. As a composition of matter a piperidine compound represented by the formula

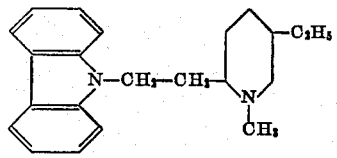

4. As a composition of matter a piperidine compound represented by the formula

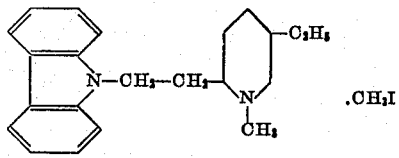

5. As a composition of matter a piperidine compound represented by the formula

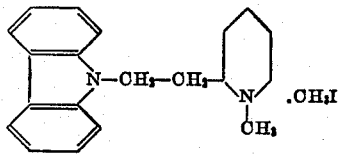

No references cited.